(12) United States Patent
Bathiche et al.

(10) Patent No.: US 7,161,582 B2
(45) Date of Patent: Jan. 9, 2007

(54) DATA INPUT DEVICE FOR TRACKING AND DETECTING LIFT-OFF FROM A TRACKING SURFACE BY A REFLECTED LASER SPECKLE PATTERN

(75) Inventors: Steven Nabil Bathiche, Bellevue, WA (US); Gary Keith Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 10/652,882

(22) Filed: Aug. 29, 2003

(65) Prior Publication Data

US 2005/0057492 A1 Mar. 17, 2005

(51) Int. Cl.
*G09G 5/08* (2006.01)

(52) U.S. Cl. .................. 345/156; 345/157; 345/163; 345/166

(58) Field of Classification Search ......... 345/156–166
See application file for complete search history.

(56) References Cited

U.S. PATENT DOCUMENTS

| | | | |
|---|---|---|---|
| 4,364,035 A * | 12/1982 | Kirsch .................. | 345/166 |
| 4,719,455 A | 1/1988 | Louis | |
| 4,794,384 A | 12/1988 | Jackson | |
| 5,107,541 A | 4/1992 | Hilton | |
| 5,274,361 A | 12/1993 | Snow | |
| 5,574,480 A * | 11/1996 | Pranger et al. .......... | 345/166 |
| 5,644,139 A | 7/1997 | Allen et al. | |
| 5,729,009 A | 3/1998 | Dändliker et al. | |
| 5,793,357 A | 8/1998 | Ivey et al. | |
| 5,852,434 A | 12/1998 | Sekendur | |
| 5,907,152 A | 5/1999 | Dändliker et al. | |
| 6,031,218 A | 2/2000 | Piot et al. | |
| 6,124,587 A | 9/2000 | Bidiville et al. | |
| 6,151,015 A | 11/2000 | Badyal et al. | |
| 6,172,354 B1 | 1/2001 | Adan et al. | |
| 6,246,482 B1 | 6/2001 | Kinrot et al. | |
| 6,249,591 B1 | 6/2001 | Tullis | |

(Continued)

FOREIGN PATENT DOCUMENTS

GB 2272763 A 5/1994

(Continued)

OTHER PUBLICATIONS

Schnell et al., "Detection of Movement with Laser Speckle Patterns: Statistical Properties," Optical Society of America, Jan. 1998, pp. 207-216, vol. 15, No. 1.

(Continued)

*Primary Examiner*—Amr Awad
*Assistant Examiner*—Sameer Gokhale
(74) *Attorney, Agent, or Firm*—Senniger Powers (57) ABSTRACT

A data input device for use with a tracking surface having light-scattering properties. The device comprises a coherent light source for projecting a coherent light beam onto the tracking surface to reflect a speckle pattern. A detector having a field of view detects and images the speckle pattern. The detector operates in a tracking mode when the field of view intersects the coherent light beam. The intersection of the coherent light beam and the field of view comprise a detection zone. Relative movement between the coherent light beam and the tracking surface within the detection zone between is detected in the tracking mode, based on the reflected speckle pattern. Relative movement between the coherent light beam and the tracking surface outside the detection zone is not detected. A controller responsive to the detector operates in the tracking mode for correlating the imaged laser speckle pattern to track the relative movement within the detection zone.

34 Claims, 7 Drawing Sheets

U.S. PATENT DOCUMENTS

| | | |
|---|---|---|
| 6,256,016 B1 | 7/2001 | Piot et al. |
| 6,281,882 B1 | 8/2001 | Gordon et al. |
| 6,310,988 B1 | 10/2001 | Flores et al. |
| 6,330,057 B1 | 12/2001 | Lederer et al. |
| 6,424,407 B1 | 7/2002 | Kinrot et al. |
| 6,433,780 B1* | 8/2002 | Gordon et al. .............. 345/166 |
| 6,448,977 B1* | 9/2002 | Braun et al. ................ 715/701 |
| 6,452,683 B1 | 9/2002 | Kinrot et al. |
| 6,454,482 B1 | 9/2002 | Silverbrook et al. |
| 6,455,840 B1 | 9/2002 | Oliver et al. |
| 6,474,888 B1 | 11/2002 | Lapstun et al. |
| 6,498,604 B1 | 12/2002 | Jensen |
| 6,529,184 B1 | 3/2003 | Julienne |
| 6,531,692 B1 | 3/2003 | Adan et al. |
| 6,642,506 B1 | 11/2003 | Nahum et al. |
| 7,009,700 B1 | 3/2006 | Dubois et al. |
| 2002/0078363 A1* | 6/2002 | Hill et al. ................... 713/189 |
| 2002/0145588 A1 | 10/2002 | McCahon et al. |
| 2003/0103037 A1* | 6/2003 | Rotzoll ....................... 345/157 |
| 2004/0061680 A1 | 4/2004 | Taboada |
| 2005/0035947 A1* | 2/2005 | Lutian ........................ 345/166 |

FOREIGN PATENT DOCUMENTS

| | | |
|---|---|---|
| WO | WO 97/43607 A1 | 11/1997 |

OTHER PUBLICATIONS

Asakura et al., "Dynamic Laser Speckles and Their Application to Velocity Measurements of the Diffuse Object," Applied Physics, 1981, 179-194.

Ohtsubo et al., "Velocity Measurement of a Diffuse Object by Using Time-Varying Speckles," Optical and Quantum Electronics, 1976, pp. 523-529, Chapman and Hall Ltd., Great Britain.

Meyer, "Pen Computing: A Technology Overview and A Vision," ACM SIGCHI Bulletin, Jul. 1995, pp. 46-90, vol. 27, Issue 3, ACM Press, New York, USA.

* cited by examiner

DATA INPUT DEVICE FOR TRACKING AND DETECTING LIFT-OFF FROM A TRACKING SURFACE BY A REFLECTED LASER SPECKLE PATTERN

INCORPORATION BY REFERENCE

The following U.S. patent is hereby fully incorporated by reference: U.S. Pat. No. 6,531,692 B1 issued to Adan et al., entitled "OPTICAL COUPLING ASSEMBLY FOR IMAGE SENSING OPERATOR INPUT DEVICE", and assigned to Microsoft Corporation.

TECHNICAL FIELD

Embodiments of the present invention relate to the field of computer input devices, and particularly data input devices, such as a mouse or optical pen, employing coherent light striking a tracking surface. In particular, embodiments of this invention relate to data input devices defining and controlling a detection zone defined by the intersection of a coherent light beam and a field of view of a detector for detecting a speckle pattern and operating in a tracking mode when the tracking surface is within the detection zone and a non-tracking mode when the tracking surface is outside the detection zone.

BACKGROUND OF THE INVENTION

Previous computer input devices, such as mice, include rotatable balls mounted within a housing, yet rotatably engaging a surface. As the housing of such a mouse translates across the surface, the ball rotates within the housing, engaging horizontal and vertical wheels that rotate against the ball, thereby indicating horizontal and vertical movement of the mouse across the surface. When the device is lifted from the surface, hereinafter referred to as lift-off, the ball stops rotating and the horizontal and vertical movement information provided by the wheels stops. Horizontal and vertical wheel rotation translates into an on-screen visual image of a cursor that responds to movement of the device. Because such devices have a moving ball that must pass through a hole in the housing, such devices often become contaminated with dust and dirt, which may yield inaccurate or intermittent cursor tracking. Moreover, the tracking surface and ball must have sufficient friction between the two to cause the ball to rotate when the housing translates over the surface. To help provide such friction and minimize contamination of the device, specialized tracking surfaces (e.g., mouse pads) are typically used. Thus, a major limitation of such a device is that it requires a tracking surface with particular characteristics, such as adequate friction and cleanliness, which are not readily found on all surfaces.

Building upon these primarily mechanical tracking devices, optical tracking devices have become available. Such devices optically track movement of a surface, rather than mechanically as with the devices described immediately above. These systems may avoid some of the drawbacks associated with the devices described above. In particular, these devices typically do not require wheels in contact with a movable ball, which acts as a common collection point for dust and dirt. Instead, the ball is typically covered with a distinct pattern. As the ball rotates over a surface, photodetectors facing another side of the ball collect information about the movement of the distinct pattern of the ball as the ball rotates. A tracking engine then collects this information, determines which way the pattern is translating and translates a cursor similarly, as described above. These devices offer improvements over previous designs by eliminating moving parts (the wheels) and changing the ball detection interaction from mechanical to optical. However, such devices lack the ability to track on any surface, requiring a suitable frictional interface between the ball and the surface. Moreover, these devices still require one moving part, the ball. In addition, aliasing artifacts may cause the cursor to skip, rather than move fluidly.

Still other optical devices place the pattern on the tracking surface (e.g., a mouse pad), rather than on the rotatable ball, thereby using the mouse pad to generate optical tracking information. Although such devices are able to eliminate the moving ball, they are less universal by requiring a specific tracking surface to operate.

Other more recent optical tracking devices have emerged that have eliminated the need for a patterned ball or mouse pad. One such device utilizes an LED to project light across the tracking surface at a grazing angle to the tracking surface. The mouse then collects tracking information by two methods. First, by tracking changes in color on the tracking surface by any pattern that may appear on the tracking surface, or second, by detecting dark shadows cast by high points in the surface texture, which appear as dark spots. This device eliminates the moving ball of previous devices, and is useful on a variety of surfaces. However, smooth surfaces with little color variation, such as surfaces with a fine microfinish similar to glass or clear plastic, may prove difficult to track upon. Smooth surfaces generate no shadows from texture and present a low contrast image that may not provide adequate features upon which to track. Surfaces with very little color variation also present a low contrast image that may not provide adequate features upon which to track. For example, such a mouse could not track upon opal glass, which is a material consisting of very small colorless particles imbedded in a clear glass matrix. Opal glass generally includes a uniform colored surface and is very smooth.

However, these systems lack the ability to both track movement of a tracking surface over substantially any surface and detect when the device has been removed from the tracking surface for freezing the cursor.

SUMMARY OF THE INVENTION

Accordingly, a data input device defining and controlling a detection zone defined by the intersection of a coherent light beam and a field of view of a detector for detecting a speckle pattern and operating in a tracking mode when the tracking surface is within the detection zone and a non-tracking mode when the tracking surface is outside the detection zone is desired to address one or more of these and other disadvantages.

In accordance with one aspect of the invention, a data input device for use with a tracking surface having light-scattering properties with respect to the device is disclosed. The device comprises a coherent light source for projecting a coherent light beam onto the tracking surface to reflect a speckle pattern from the coherent light beam striking the tracking surface. A detector associated with the coherent light source detects the speckle pattern reflected by the tracking surface and images the detected speckle pattern. The detector has a field of view and operates in a tracking mode when the field of view intersects the coherent light beam striking the tracking surface. The intersection of the coherent light beam and the field of view comprise a detection zone, wherein relative movement within the detection zone between the coherent light beam and the tracking surface is detected in the tracking mode based on the reflected speckle pattern, and wherein relative movement outside the detection zone between the coherent light beam and the tracking surface is not detected. A controller responsive to the detector operates in the tracking mode for correlating the imaged laser speckle pattern to track the relative movement within the detection zone.

In another aspect of the invention, a method comprises projecting a coherent light beam from a data input device onto a diffuse tracking surface and detecting out-of-phase coherent light reflected by the tracking surface. The method further comprises determining if the device is spatially separated from the tracking surface by at least a lift-off detection distance as a function of the detected out-of-phase coherent light. The method further either suspends tracking of relative movement between the device and the tracking surface when the device is spatially separated from the tracking surface by at least the lift-off detection distance or maintains tracking of relative movement between the device and the tracking surface when the device is spatially separated from the tracking surface by less than the lift-off detection distance.

In yet another aspect of the invention, a data input device for use with a tracking surface having light-scattering properties with respect to the device is disclosed. A coherent light source projects a coherent light beam onto the tracking surface to reflect a speckle pattern from the coherent light beam striking the tracking surface. A detector associated with the coherent light source detects the speckle pattern reflected by the tracking surface. A controller responsive to the detector detects a change in the total image intensity of the reflected speckle pattern. The change in the total image intensity being related to a distance between the housing and the tracking surface.

In still another aspect of the invention, a data input device suspends tracking of movement with respect to a tracking surface having light-scattering properties. A source projects a coherent light beam from the device toward the tracking surface. A detector detects the total image intensity of any speckle pattern reflected by the coherent light beam striking the tracking surface. A controller determines if the device is spatially separated from the tracking surface by detecting a change in the total image intensity of any reflected speckle pattern. The change in the total image intensity being related to a lift-off detection distance of the housing from the tracking surface. The controller suspends tracking of relative movement between the device and the tracking surface when the device is spatially separated from the tracking surface by at least the lift-off detection distance or maintains tracking of relative movement between the device and the tracking surface when the device is spatially separated from the tracking surface by less than the lift-off detection distance.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
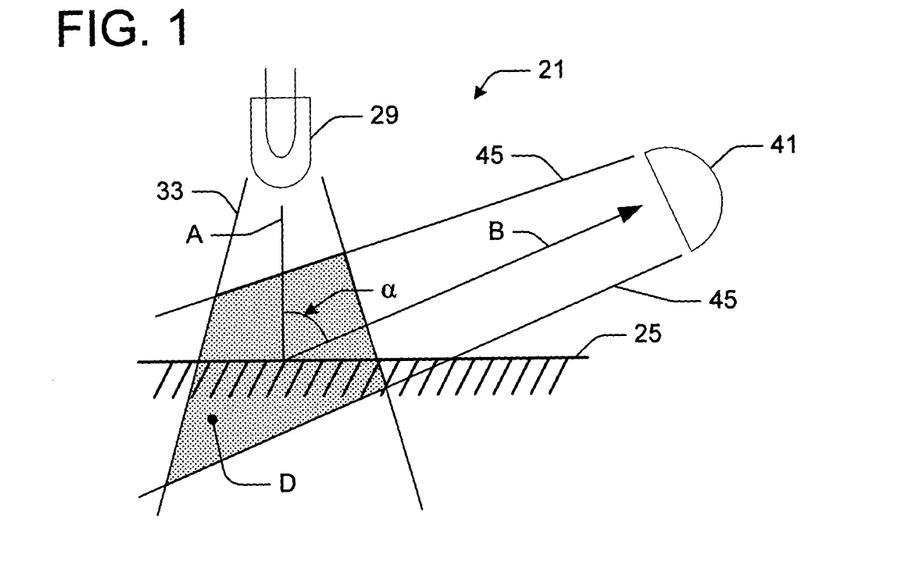
FIG. 1 is a schematic of a device of the present invention wherein a tracking surface is within a detection zone.
Figure 1A:
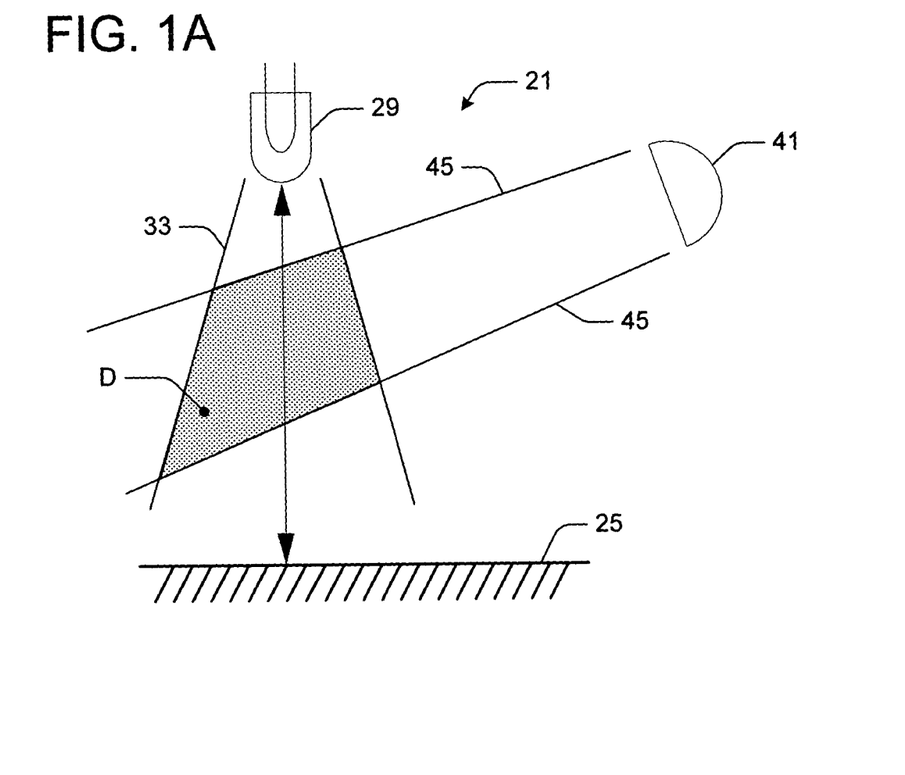
FIG. 1A is a schematic of the device of FIG. 1 wherein the tracking surface is outside the detection zone.
Figure 3:
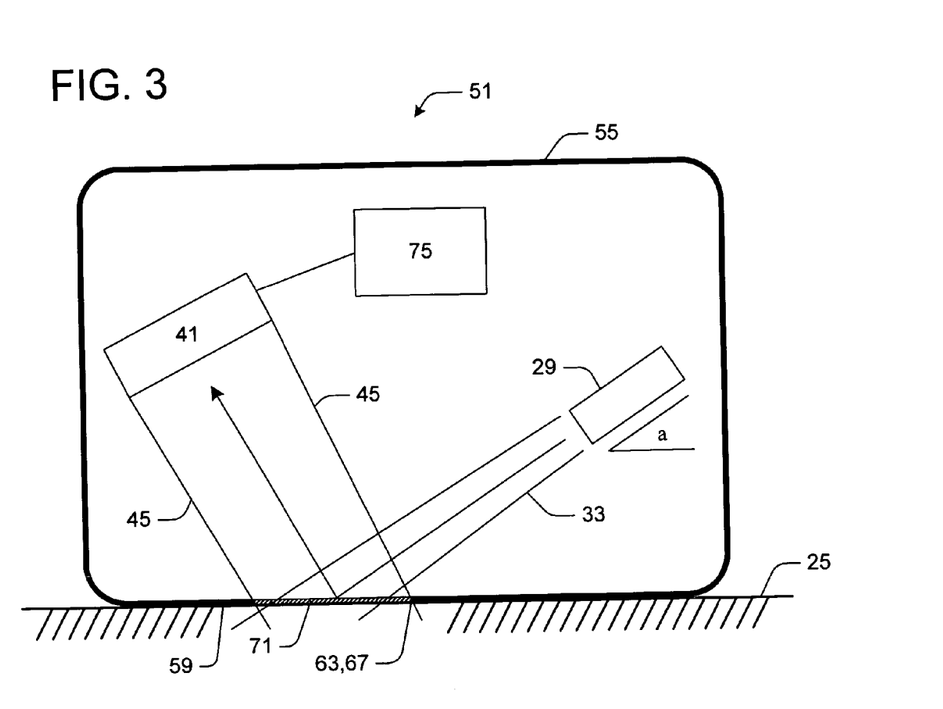
FIG. 3 is a schematic of a device of the present invention engaging the tracking surface.
Figure 4:
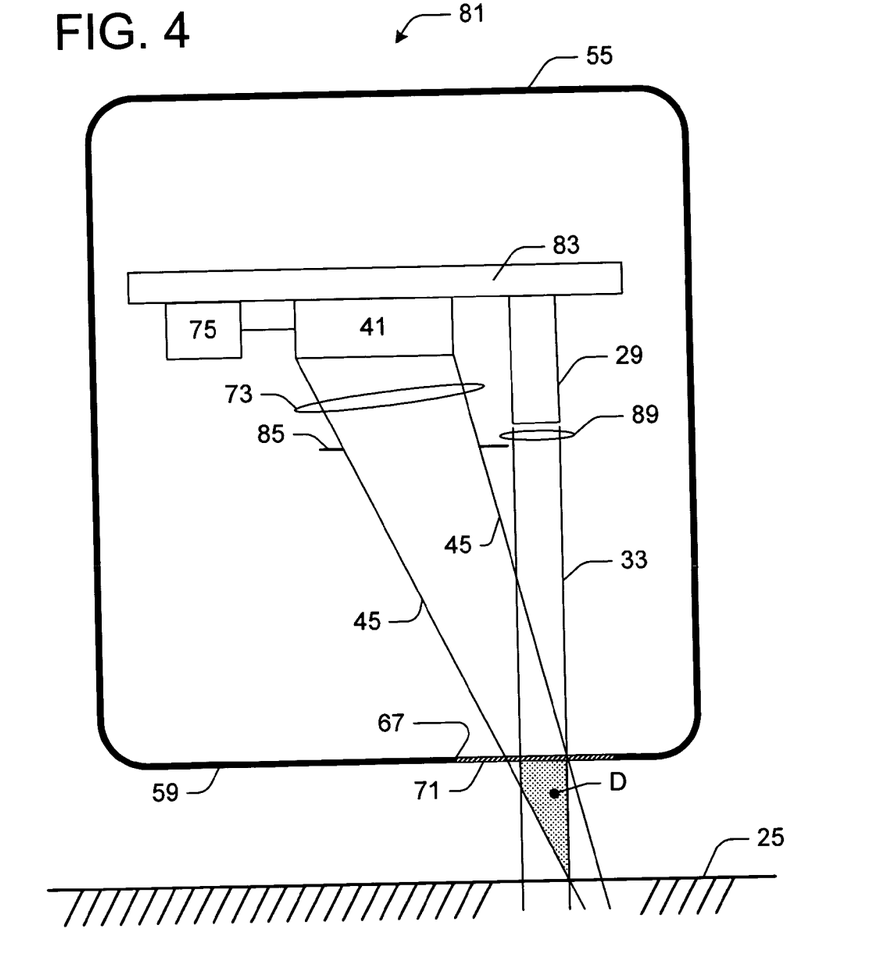
FIG. 4 is a schematic of a device of the present invention with components mounted on a single chip.

Referring first to FIGS. 1 and 1A, schematics of data input devices 21 for use with a tracking surface 25 are depicted. FIG. 1 depicts the tracking surface 25 within a detection zone D (shaded), and FIG. A depicts the tracking surface outside the detection zone. The device 21 of FIGS. 1 and 1A is greatly simplified to demonstrate the basic concepts of the present invention. FIGS. 3–4 provide a more detailed construction.

Figure 2:
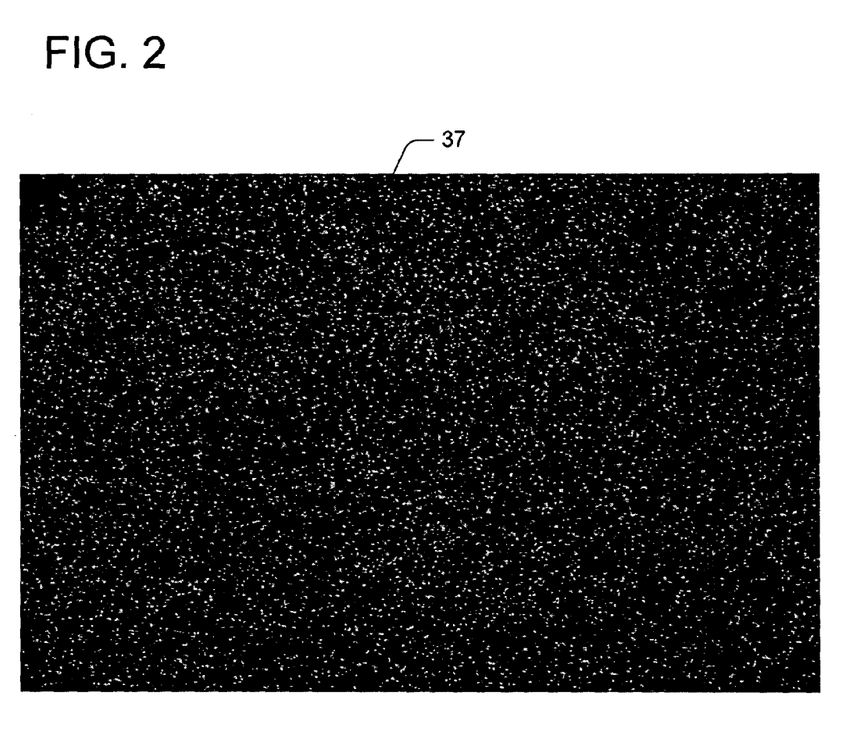
FIG. 2 is an image of a speckle pattern.

As shown in FIGS. 1 and 1A, a coherent light source 29 projects a coherent light beam 33, having a central axis A, onto the tracking surface 25. The tracking surface is a diffuse surface, having light-scattering properties sufficient to reflect a speckle pattern 37 (e.g., FIG. 2) when the coherent light beam 33 strikes the tracking surface. For example, paper, wood, metal, fabric, certain plastics and human skin each generally have sufficient surface variation to reflect a speckle pattern 37. Only surfaces that are perfectly reflective, i.e., mirrorlike, such as a ground and polished, optic-quality, flat, transparent glass, are insufficiently rough to reflect a speckle pattern 37. Therefore, when the coherent light source 29 projects a coherent light beam 33 (e.g., a laser beam) onto the tracking surface 25, the light-scattering properties of the tracking surface are sufficient to reflect a speckle pattern 37. Speckle patterns created when coherent light strikes diffuse surfaces are well known in the art, and their origin and theory will not be reviewed in detail here.

A detector 41 associated with the coherent light source 29 is positioned for detecting the speckle pattern 37 reflected by the tracking surface 25 and for imaging the detected speckle pattern. The detector 41 has a field of view, defined by lines 45 and a central axis B. An angle α between axis A and axis B defines the angular relationship between the coherent light beam 33 and the field of view 45. Such detectors 41 may include photodetectors, CCDs (charge-coupled devices), CMOS (complementary metal-oxide semiconductor) technology or other detector arrays that are capable of both the bandwidth and spectral requirements mandated by the coherent light source 29.

The device 21 operates in a tracking mode when the field of view 45 intersects the coherent light beam 33 as it strikes the tracking surface 25, as depicted in FIG. 1. The intersection of the coherent light beam 33 and the field of view 45 form the detection zone D. Relative movement between the coherent light beam 33 and the tracking surface 25 within the detection zone D is detected in the tracking mode based on the reflected speckle pattern 37. In contrast, relative movement outside the detection zone D between the coherent light beam 33 and the tracking surface 25 is not detected, because the reflected speckle pattern 37 is unable to reach the detector 41, as shown in FIG. 1A. This inability to reach the detector 41 is due to the speckle pattern 37 being partially blocked from reflecting upon the detector, an increase in the noise, rather than signal, received by the detector and/or a decrease in the total image intensity received by the detector, as discussed in detail below with respect to FIGS. 3–4.

Figure 3A:
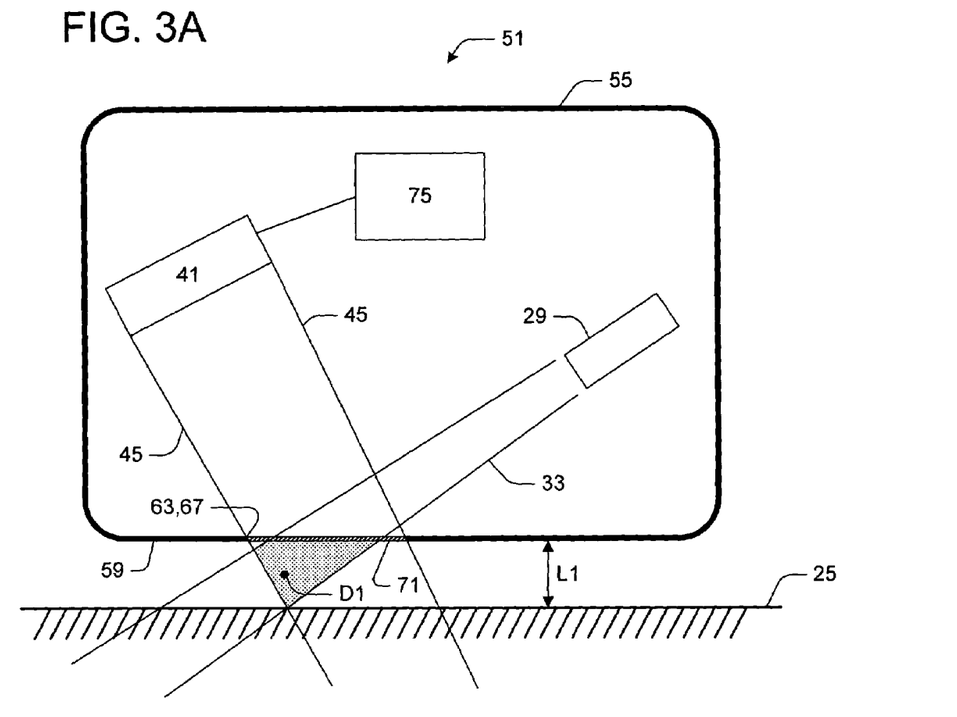
FIG. 3A is a schematic of the device of FIG. 3 lifted to a primary lift-off detection distance.
Figure 3B:
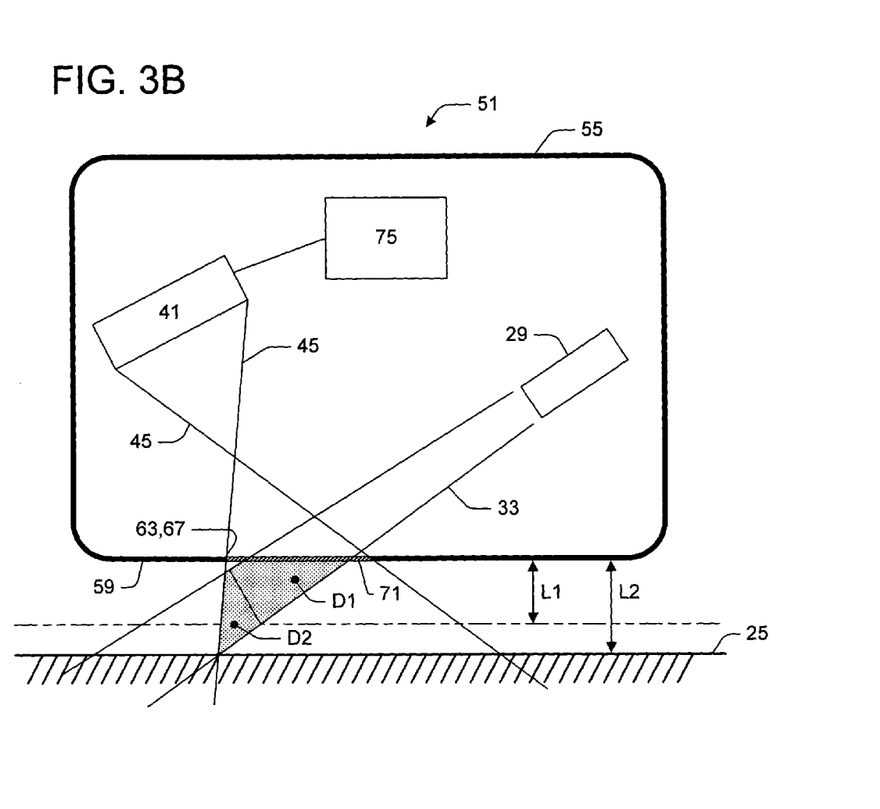
FIG. 3B is a schematic of the device of FIG. 3 lifted to a secondary lift-off detection distance.

FIGS. 3, 3A and 3B are more detailed schematics of a device 51 of the present invention depicting the device being lifted from the tracking surface 25. Specifically, FIG. 3 is a schematic of the device 51 engaging the tracking surface, FIG. 3A is a schematic of the device lifted to the limit of a primary detection zone D1 and FIG. 3B is a schematic of the device lifted to the limit of a secondary detection zone D2. It should be noted here that the terms "lift-off" or "lifting" the device additionally comprise lifting, or moving, the tracking surface away from the stationary device, rather than lifting the device away from the tracking surface. In addition, referring to relative movement between the device and the tracking surface may comprise movement of the device (e.g., a mouse moving over a mouse pad), movement of the tracking surface (e.g., a moving trackball or human skin moving in the path of a coherent light beam), or movement of both the tracking surface and the device.

The device 51 includes a coherent light source 29 and detector 41, generally as set forth above. The coherent light source 29 projects a coherent light beam 33 and the detector has a field of view 45, substantially as set forth above. The device 21 further includes a housing 55 for receiving the coherent light source 29 and the detector 41. The housing 55 includes a support surface 59 engageable with the tracking surface 25 for positioning and orienting the housing when tracking. The support surface 59. includes a substantially planar face engageable with the tracking surface 25.

The field of view 45 of the detector 41 is defined by a field stop 63. Although the field stop 63 may take several different forms, the field stop depicted in FIGS. 3, 3A and 3B comprises an aperture 67 formed in the housing 55. The aperture 67 limits the direction in which coherent light reflected from the tracking surface 25 can strike the detector 41. Decreasing the size of the field stop 63 will decrease the field of view 45, while increasing the size of the field stop will increase the field of view. Moreover, positioning the detector 41 and aperture 67 of the field stop 63 further apart will decrease the field of view 45, while positioning the detector and aperture closer together will increase the field of view. One skilled in the art would readily understand how to manipulate one or both of field stop 63 size and the position of the detector 41 to precisely control the field of view 45 of the detector 41. The field stop 63 further includes a transparent window 71 received in the aperture 67 of the housing 55 to limit the ability of dust and dirt to enter the housing.

The device 51 further includes a controller 75 responsive to the detector 41 and operating in the tracking mode for correlating the imaged laser speckle pattern 37 to track the relative movement of the tracking surface 25 within the detection zone D. As discussed above with respect to FIGS. 1 and 1A, the detector 41 and controller 75 additionally operate in a non-tracking mode, wherein the detector does not detect the relative movement of the tracking surface 25 because the tracking surface is outside the detection zone D. For example, in FIG. 3A, the primary detection zone D1 defines the intersection of the field of view 45 of the detector 41 and the coherent light beam 33. If the tracking surface 25 lies within the primary detection zone D1, then the detector 41 will detect the speckle pattern 37. Beyond a primary lift-off detection distance L1, which is defined as the limit of the primary detection zone D1, the device 51 is designed such that detection of the speckle pattern 37 is intentionally more difficult. This is in part due to the housing 55 at least partially shielding the reflected coherent light beam 33 from striking the detector 41. When shielding of the speckle pattern 37 occurs, only a portion of the reflected, out-of-phase coherent light beam 33 strikes the detector 41, and therefore the total image intensity reaching the detector may be less than a predetermined threshold intensity. If the controller 75 determines that the total image intensity of the reflected speckle pattern 37 is below the given threshold, the controller will determine that the device 51 is operating in the non-tracking mode. In other words, as the device 51 is lifted from the tracking surface 25 a distance equal to the primary lift-off detection distance L1, the controller 75 indicates that the device is in non-tracking mode.

In addition, FIG. 3B defines the secondary detection zone D2 of the device 51. Note that the field of view 45' of the detector 41 has been redrawn, to demonstrate the true potential light-collecting ability of the detector. Comparing the primary detection zone D1 and the secondary detection zone D2, the expanded field of view 45' increases the size of the detection zone. The secondary detection zone D2 represents an absolute physical limit of the detector to detect the reflected coherent light. Beyond the secondary detection zone D2, shielding by the field stop 63, here the housing 55, will preclude any reflected coherent light from striking the detector. Within the additional area of the secondary detection zone D2, partially obstructed reflected light will strike the detector. Thus, depending upon the sensitivity of the detector 41 and the location of the tracking surface 25, it is possible to track relative movement of the tracking surface within the additional limits secondary detection zone D2. In other words, as the device 51 and the tracking surface 25 move apart from one another from the primary lift-off detection distance L1 toward a secondary lift-off detection distance L2, the controller 75 is more and more likely to indicate that the device is in non-tracking mode. For example, it is likely that the tracking surface location depicted in FIG. 3B would not be trackable, because only a small fraction of the detector, the far right edge, is in a direct line with a small fraction of the projected coherent light, the far right edge, striking the tracking surface 25. However, for a tracking surface location just below the limit of the primary detection zone D1, it is more likely that the tracking surface would be trackable, because a substantial portion of the detector 41, is directly opposite the coherent light beam 33 striking the tracking surface. Again, the ability of the detector 41 to detect movement of the tracking surface 25 within the secondary detection zone D2 depends upon the sensitivity of the detector, which is discussed below in more detail.

Another factor that can alter the shape of the detection zones D1,D2 is the angle a (FIG. 1) between the coherent light beam 33 and the field of view 45. For example, one device 51 includes an angle α between about 0 radians (0 degrees) and about 1.5 radians (85 degrees). Another device 51 has an angle α between about 260 milliradians (15 degrees) and about 1.0 radians (60 degrees). Yet another device 51 comprises an angle α between about 520 milliradians (30 degrees) and about 790 milliradians (45 degrees). Adjusting the angle α can alter the proportions and dimensions of the detection zone D. For example, all other things being equal, a large angle α, such as about 1.5 radians (85 degrees), will create a shallower detection zone D, while a smaller angle α, such as about 260 milliradians (15 degrees), will create a deeper detection zone. The smaller angle α is capable of creating the deeper detection zone D because of the substantial alignment of the coherent light source axis A with the field of view axis B.

In use, the detector 41 detects the out-of-phase coherent light reflected by the tracking surface 25. The controller 75 then determines if the device 51 is spatially separated from the tracking surface by at least some lift-off detection distance, which may fall between the primary lift-off detection distance L1 and the secondary lift-off detection distance L2, as discussed above. The controller 75 makes this determination as a function of the detected out-of-phase coherent light striking the detector 41 (e.g., if sufficient reflected, out-of-phase coherent light is striking the detector). Thus, when the device 51 is spatially separated from the tracking surface 25 by a lift-off detection distance, the controller suspends tracking of relative movement between the device and the tracking surface. Alternately, when the device 51 is spatially separated from the tracking surface 25 by less than a lift-off detection distance, the controller maintains tracking of relative movement between the device and the tracking surface.

The lift-off detection distances L1,L2 represent estimates of the distance at which lift-off is determined by the controller 75. On a more fundamental level, the controller 75 is actually determining that relative movement between the tracking surface 25 and the device 51 is not detectable because the reflected, out-of-phase coherent light striking the detector 41 has a signal-to-noise ratio less than a threshold signal-to-noise ratio. The signal-to-noise ratio is a measure of the quality of the reflected speckle pattern 37 striking the detector 41. Where the detector 41 is gathering insufficient reflected coherent light to meet this threshold signal-to-noise ratio, the controller 75 will suspend tracking. Where the detector 41 is gathering sufficient reflected coherent light to meet this threshold signal-to-noise ratio, the controller 75 will maintain tracking. For example, a higher signal-to-noise ratio indicates that the speckle pattern 37 is of better quality than one with a lower signal-to-noise ratio. The primary factor affecting the signal-to-noise ratio is the amount of reflected coherent light reaching the detector 41. Where much of the speckle pattern 37 is blocked by the housing 55 or the field stop 63, the signal-to-noise ratio will fall, indicating that less reflected coherent light is reaching the detector. Such is the case when the tracking surface is outside the detection zone D. Where little or none of the speckle pattern 37 is blocked by the housing 55 or the field stop 63, the signal-to-noise ratio will rise, indicating that more reflected coherent light is reaching the detector. Such is the case when the tracking surface 25 is well within the detection zone D. On the margins of the detection zone D1,D2, other factors such as speckle boiling and surface reflectivity will also contribute.

The level of the threshold signal-to-noise ratio will determine the responsiveness of the controller 75 to changes in image quality detected by the detector 41. Thus, altering the threshold signal-to-noise ratio can alter the sensitivity of the device 51. A device 51 with a high threshold signal-to-noise ratio (e.g., 90%) would be very sensitive to degradation in image quality. Such a device 51 would have correspondingly smaller detection zones D1,D2, because any small degradation in image quality due to lift-off would be detected by the detector. Such a device 51 would track well when engaging the tracking surface 25, but would almost immediately stop tracking once the device is lifted from the tracking surface. For example, a device 51 functioning as a mouse would likely require a high threshold signal-to-noise ratio so that as the mouse is lifted from the tracking surface 25, tracking will cease until the mouse nearly touches the surface. In contrast, a device 51 with a low threshold signal-to-noise ratio (e.g., 10%) would be much less sensitive to degradation in image quality. Such a device 51 would have correspondingly larger detection zones, up to the size of the secondary detection zone D2, because even a large degradation in image quality will not be characterized as lift-off by the detector 41. Such a device 51 would track well when engaging the tracking surface 25, and would continue to track virtually to the point where the tracking surface 25 reaches the secondary lift-off detection distance L2, if there is adequate data detected by the detector. For example, a device 51 functioning as an optical pen in an off-surface tracking mode would likely require a low threshold signal-to-noise ratio so that tracking will continue as the pen is lifted from the tracking surface 25.

An important benefit of this is the ability of a single device 51 to exhibit different characteristics depending upon the threshold signal-to-noise ratio. By setting a different signal-to-noise ratio threshold, such as by user input, one device 51 can operate in multiple ways. For example, one device 51 includes a controller 75 having a threshold signal-to-noise ratio of 50%. The same or different device 51 may yet include a controller 75 comprising a threshold signal-to-noise ratio of 25%. Still the same or another device 51 includes a controller 75 with a threshold signal-to-noise ratio of 10%.

Many different devices may be constructed according to the above description. For example, one device 51 includes a detection zone D that extends from the housing 55 beyond the support surface 59 to a lift-off detection distance L of no more than about 5 millimeters (0.20 inch). Another device 51 includes a lift-off detection distance L of no more than about 4 millimeters (0.16 inch). Yet another device 51 has a lift-off detection distance L of no more than about 4 millimeters (0.16 inch) and at least about 1 millimeter (0.04 inch). Still another device 51 includes a lift-off detection distance L of no more than about 3 millimeters (0.12 inch) and at least about 1 millimeter (0.04 inch). Another device includes a lift-off detection distance L of no more than about 3 millimeters (0.12 inch) and at least about 1.5 millimeters (0.06 inch). Yet another device 51 has a lift-off detection distance of no more than about 3 millimeters (0.12 inch) and at least about 2 millimeters (0.08 inch).

FIG. 4 is a schematic of a device 81 of the present invention with several components mounted on a single microchip. Specifically, device 81 comprises a housing 55, coherent light source 29, detector 41 and controller 75 generally as set forth above. In addition, the controller 75, detector 41 and coherent light source 29 are mounted adjacent each other on the same microchip 83, providing the added benefit of manufacturing these components as a single piece. The single microchip 83 design improves packaging because it is compact and lowers cost because only a single chip is required.

The device 81 additionally includes a detector optic 73 for altering the shape of the reflected speckle pattern 37 received by the detector 41. Such an optic 73 may be used to gather more or less reflected light, depending upon the needs of the particular device 81. One skilled in the art would readily understand these considerations. Moreover, the device 81 includes a field stop 85 mounted on, yet separate from, the housing 55. As depicted in FIG. 4, the field stop 85 and optic 73 may cooperate to define the field of view 45 of the detector 41. It should also be noted that the detector optic 73 and field stop 63, although shown in combination in FIG. 4, could alternately be utilized singly to create an appropriate field of view 45, without departing from the scope of the present invention.

The device 81 further includes an optic 89 for refracting the coherent light beam 33 into a planar wavefront that provides profiles substantially parallel with the support surface 59, or substantially perpendicular to the propagation of the coherent light beam in the present device. Although not shown, the optic may also be integral with the coherent light source 29. Because the coherent light beam 33 aids in defining the shape of the detection zone D, the choice of optic 89 impacts the shape of such zone. For instance, one such device 81 comprises an optic 89 that refracts the coherent light beam 33 such that beam divergence is less than 87 milliradians (5 degrees). Another device 81 with the optic 89 controls beam divergence to less than 70 milliradians (4 degrees). Still another device 81 comprises an optic 89 controlling beam divergence to less than 52 milliradians (3 degrees). Yet another device 81 comprises an optic 89 that refracts the beam such that beam divergence is less than or equal to 35 milliradians (2 degrees).

Throughout the several embodiments of the present invention, the coherent light source 29 is a laser, such as a vertical cavity surface emitting laser (VCSEL). Although any type of laser may be used, a VCSEL has the distinct advantage drawing less than about 1.0 mW (1.3 μhorsepower) of power. In addition, VCSELs are relatively small in size, easing packaging considerations, and are relatively inexpensive to manufacture, easing cost considerations. Other lasers and sources of coherent light may also be utilized without departing from the scope of the claimed invention.

Similar to the threshold signal-to-noise ratio discussed above, the several embodiments of the present invention also define a device wherein the relative movement of the tracking surface 25 outside the detection zone is not detected because the controller 75 determines that reflected, out-of-phase coherent light striking the detector 41 has a total image intensity less than a predetermined threshold intensity. The change in the total image intensity is related to the distance between the housing 55 and the tracking surface 25. In some instances, the change in the total image intensity is proportional to the distance between the housing 55 and the tracking surface 25. One such device detects such a change in total image intensity when the distance between the housing 55 and the tracking surface 25 is no more than about 5 millimeters (0.20 inch). Another device detects such a change in total image intensity when the distance between the housing 55 and the tracking surface 25 is no more than about 4 millimeters (0.16 inch). Still another device detects such a change when the distance between the housing 55 and the tracking surface 25 is no more than about 3 millimeters (0.12 inch) and at least about 1 millimeter (0.04 inch).

Figure 5:
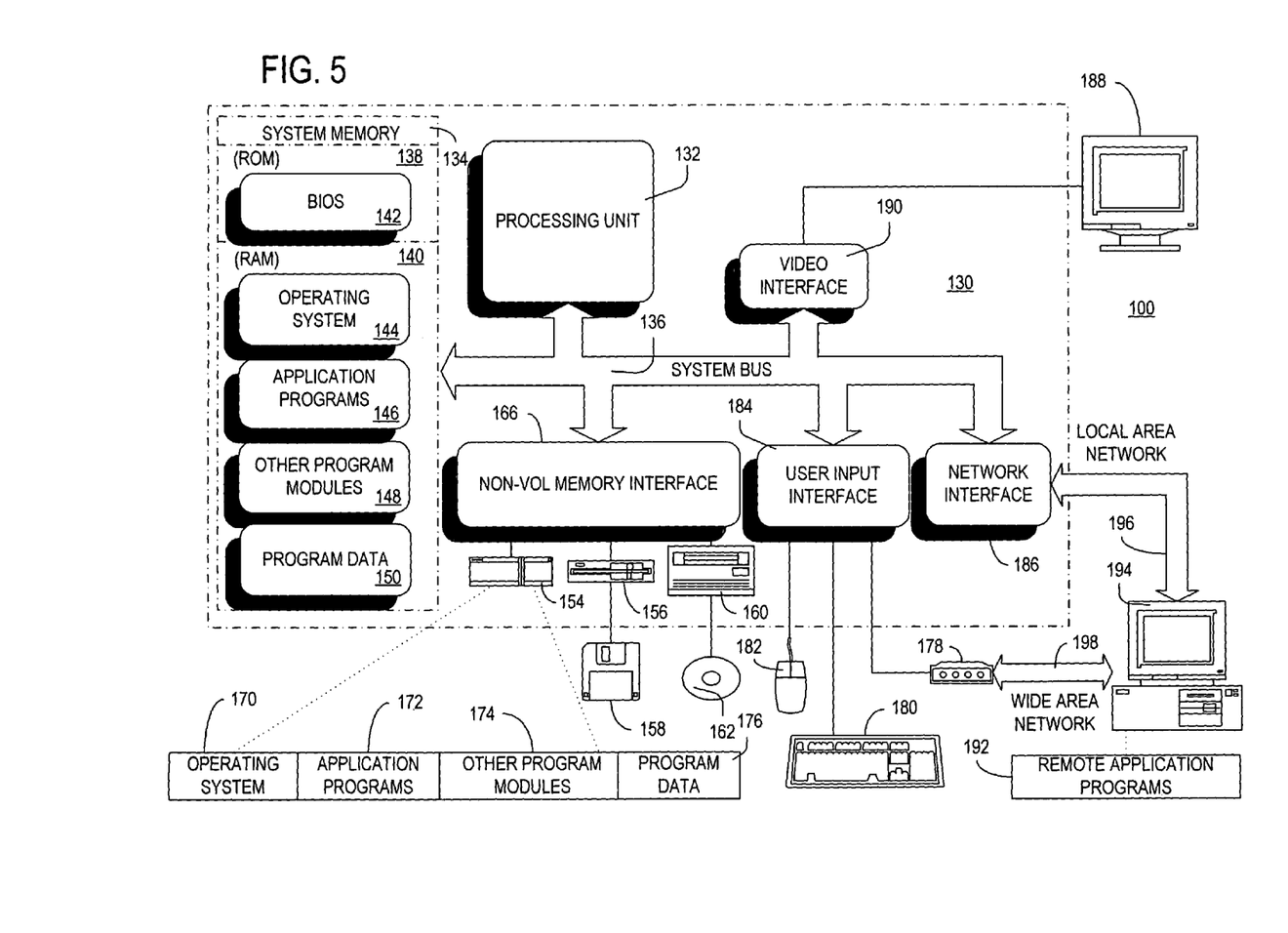
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A data input device for use with a tracking surface, said tracking surface having light-scattering properties with respect to said device, said device comprising:
   a coherent light source for projecting a coherent light beam onto said tracking surface to reflect a speckle pattern from the coherent light beam striking said tracking surface;
   a detector associated with the coherent light source for detecting said speckle pattern reflected by the tracking surface and for imaging the detected speckle pattern;
   a field stop and an optic configured for defining a field of view and an expanded field of view of the detector, wherein the detector operates in a tracking mode when either the field of view or the expanded field of view, or both, intersects said coherent light beam striking the tracking surface, the intersection of the coherent light beam and the field of view comprising a primary detection zone extending from the device to a primary lift-off detection distance and the intersection of the coherent light beam and the expanded field of view comprising a secondary detection zone extending from the device to a secondary lift-off detection distance, said field stop being further configured for reducing the size of the primary detection zone and the secondary detection zone by blocking all of the reflected speckle pattern from reaching the detector when the tracking surface is outside the detection zones to reduce the primary lift-off detection distance and the secondary lift-off detection distance, wherein relative movement within the detection zones between said coherent light beam and said tracking surface is detected in the tracking mode based on the reflected speckle pattern, and wherein relative movement outside the detection zones between said coherent light beam and said tracking surface is not detected due to the field stop blocking all of the reflected speckle pattern from reaching the detector, thereby providing lift-off detection near the device for suspending tracking upon movement of the tracking surface and the device apart from one another greater than the primary lift-off detection distance and the secondary lift-off detection distance; and a controller responsive to the detector operating in the tracking mode for correlating the imaged laser speckle pattern to track the relative movement within the detection zones.

2. A device as set forth in claim 1 further comprising a housing for the coherent light source and the detector, said housing including a support surface engageable with said tracking surface.

3. A device as set forth in claim 2 wherein said primary and secondary detection zones extend from said housing beyond said support surface to respective primary and secondary lift-off detection distances, each distance being no more than about 5 millimeters (0.20 inch).

4. A device as set forth in claim 3 wherein each of said primary and secondary lift-off detection distances is no more than about 4 millimeters (0.16 inch).

5. A device as set forth in claim 4 wherein each of said primary and secondary lift-off detection distances is no more than about 4 millimeters (0.16 inch) and at least about 1 millimeter (0.04 inch).

6. A device as set forth in claim 5 wherein each of said primary and secondary lift-off detection distances is no more than about 3 millimeters (0.12 inch) and at least about 1 millimeter (0.04 inch).

7. A device as set forth in claim 6 wherein each of said primary and secondary lift-off detection distances is no more than about 3 millimeters (0.12 inch) and at least about 1.5 millimeters (0.06 inch).

8. A device as set forth in claim 7 wherein each of said primary and secondary lift-off detection distances is no more than about 3 millimeters (0.12 inch) and at least about 2 millimeters (0.08 inch).

9. A device as set forth in claim 2 wherein said support surface includes a substantially planar face engageable with said tracking surface.

10. A device as set forth in claim 2 wherein the optic is adapted for refracting the coherent light beam into planar waves substantially parallel with the support surface.

11. A device as set forth in claim 1 wherein said coherent light source and said detector are mounted adjacent each other on a microchip.

12. A device as set forth in claim 1 wherein said primary lift-off detection distance and said secondary lift-off detection distance are each no more than about 50 percent larger than the distance of the smaller of the primary lift-off detection distance and the secondary lift-off detection distance.

13. A device as set forth in claim 1 wherein said field stop comprises an aperture in a housing receiving the detector.

14. A device as set forth in claim 1 wherein said field stop includes a transparent window of a housing receiving the detector.

15. A device as set forth in claim 1 wherein the optic is integral with the detector.

16. A device as set forth in claim 1 wherein the coherent light source is a laser.

17. A device as set forth in claim 16 wherein said laser is a vertical cavity surface emitting laser (VCSEL).

18. A device as set forth in claim 1 wherein the coherent light source has a power consumption during operation of less than 1.0 mW (1.3 μhorsepower).

19. A device as set forth in claim 1 further comprising an optic within the coherent light beam to refract the beam such that the beam divergence is less than 87 milliradians (5 degrees).

20. A device as set forth in claim 19 wherein said beam divergence is less than 70 milliradians (4 degrees).

21. A device as set forth in claim 20 wherein said beam divergence is less than 52 milliradians (3 degrees).

22. A device as set forth in claim 21 wherein said beam divergence is less than or equal to 35 milliradians (2 degrees).

23. A device as set forth in claim 1 wherein the angle between said coherent light beam and a central axis of said field of view is between about 0 milliradians (0 degrees) and about 1.5 radians (85 degrees).

24. A device as set forth in claim 23 wherein the angle between said coherent light beam and a central axis of said field of view is between about 260 milliradians (15 degrees) and about 1.0 radians (60 degrees).

25. A device as set forth in claim 24 wherein the angle between said coherent light beam and a central axis of said field of view is between about 520 milliradians (30 degrees) and about 790 milliradians (45 degrees).

26. A method comprising:
projecting a coherent light beam from a data input device onto a diffuse tracking surface,
detecting out-of-phase coherent light reflected by the tracking surface with a detector,
controlling the amount of out-of-phase coherent light reflected by the tracking surface reaching the detector, said controlling comprising,
defining a field of view of the detector, the intersection of the projected coherent light beam and the field of view comprising a primary detection zone extending from the device to a primary lift-off detection distance,
defining an expanded field of view of the detector, the intersection of the projected coherent light beam and the expanded field of view comprising a secondary detection zone extending from the device to a secondary lift-off detection distance, and
reducing the size of the primary detection zone and the secondary detection zone and reducing the primary lift-off detection distance and the secondary lift-off detection distance,
determining if said device is spatially separated from said tracking surface by at least the primary and secondary lift-off detection distances as a function of the detected out-of-phase coherent light, thereby providing lift-off detection near the device, and either suspending tracking of relative movement between said device and said tracking surface when said device is spatially separated from said tracking surface by at least the primary and secondary lift-off detection distances by blocking all of the out-of-phase coherent light reflected by the tracking surface from reaching the detector, or maintaining tracking of relative movement between said device and said tracking surface when said device is spatially separated from said tracking surface by less than said primary and secondary lift-off detection distances by allowing at least a portion of the out-of-phase coherent light reflected by the tracking surface to reach the detector.

27. A method as set forth in claim 26 wherein said controlling defines the primary lift-off detection distance and the secondary lift-off detection distance to each be no more than about 70 percent larger than the distance of the smaller of the primary lift-off detection distance and the secondary lift-off detection distance.

28. A method as set forth in claim 27 wherein said controlling defines the primary lift-off detection distance and the secondary lift-off detection distance to each be no more than about 50 percent larger than the distance of the smaller of the primary lift-off detection distance and the secondary lift-off detection distance.

29. A method as set forth in claim 26 wherein each of said primary and secondary lift-off detection distances is no more than about 4 millimeters (0.16 inch).

30. A method as set forth in claim 29 wherein each of said primary and secondary lift-off detection distances is no more than about 4 millimeters (0.16 inch) and at least about 1 millimeter (0.04 inch).

31. A method as set forth in claim 30 wherein each of said primary and secondary lift-off detection distances is no more than about 3 millimeters (0.12 inch) and at least about 1 millimeter (0.04 inch).

32. A method as set forth in claim 31 wherein each of said primary and secondary lift-off detection distances is no more than about 3 millimeters (0.12 inch) and at least about 1.5 millimeters (0.06 inch).

33. A method as set forth in claim 32 wherein each of said primary and secondary lift-off detection distances is no more than about 3 millimeters (0.12 inch) and at least about 2 millimeters (0.08 inch).

34. A method as set forth in claim 26 further comprising refracting the coherent light beam into planar waves substantially perpendicular to the propagation of the coherent light beam.

* * * * *